(12) United States Patent
Castora et al.

(10) Patent No.: US 9,671,032 B2
(45) Date of Patent: Jun. 6, 2017

(54) DYNAMIC CURRENT COMPENSATION

(71) Applicant: FLEXTRONICS AP, LLC, Broomfield, CO (US)

(72) Inventors: Andrew Robert Castora, Grand Rapids, MI (US); Hamid Najmolhoda, Grand Rapids, MI (US); David Lee Seid, Conklin, MI (US)

(73) Assignee: Flextronics AP, LLC, San Jose, CA (US)

( * ) Notice: Subject to any disclaimer, the term of this patent is extended or adjusted under 35 U.S.C. 154(b) by 237 days.

(21) Appl. No.: 14/520,963

(22) Filed: Oct. 22, 2014

(65) Prior Publication Data

US 2016/0116077 A1    Apr. 28, 2016

(51) Int. Cl.
| | |
|---|---|
| *F16H 61/02* | (2006.01) |
| *F16K 31/06* | (2006.01) |
| *H01F 7/18* | (2006.01) |
| *G05B 17/02* | (2006.01) |
| *G05D 7/06* | (2006.01) |
| *B60T 8/36* | (2006.01) |

(52) U.S. Cl.
CPC .............. *F16K 31/061* (2013.01); *B60T 8/36* (2013.01); *G05B 17/02* (2013.01); *G05D 7/0635* (2013.01); *H01F 7/1844* (2013.01); *B60T 2260/04* (2013.01); *H01F 2007/1855* (2013.01); *H01F 2007/1866* (2013.01)

(58) Field of Classification Search
CPC ......... F16H 61/0251; F16H 2061/0087; F16H 2061/009; F16H 61/02
See application file for complete search history.

(56) References Cited

U.S. PATENT DOCUMENTS

| | | |
|---|---|---|
| 2004/0122577 A1 | 6/2004 | Bowman et al. |
| 2004/0206155 A1 | 10/2004 | Sosnowski |
| 2009/0099740 A1 | 4/2009 | Sandstrom et al. |
| 2009/0254255 A1 | 10/2009 | Seid et al. |
| 2013/0213760 A1* | 8/2013 | Wilson ................. F16D 48/066 192/85.63 |

FOREIGN PATENT DOCUMENTS

DE    102011075295 A1    8/2012

* cited by examiner

*Primary Examiner* — Huan Le (74) *Attorney, Agent, or Firm* — Volpe and Koenig, P.C.

(57) ABSTRACT

A method for characterizing a fluid control solenoid with current compensation is described. A current command is sent to the fluid control solenoid. The current command indicates a desired current value related to a desired fluid output pressure to be applied to the solenoid. An actual fluid output pressure is measured at a valve associated with the fluid control solenoid for the desired current value applied to the solenoid. An actual current received value at the fluid control solenoid is also measured. Post processing is then applied. A compensated current value related to the actual fluid output pressure is determined based on a difference between the current command and the actual current received value. Methods for dynamic current compensation are also described.

10 Claims, 11 Drawing Sheets

FIG. 1

(PRIOR ART)

DYNAMIC CURRENT COMPENSATION

FIELD OF INVENTION

The present disclosure relates to motor vehicles with automatic transmissions, and more particularly, solenoid-actuated valves in the fluid system of an automatic transmission primarily intended for use in a motor vehicle.

BACKGROUND

Automatic transmissions comprise a plurality of hydraulically operated friction devices, such as clutches and brakes, to which hydraulic pressure is selectively applied so as to engage or disengage the friction devices. The friction devices are responsible for executing various functions in the automatic transmission, such as gear ratio selection, gear shifting, and the like.

In an electronic control transmission (ECT), these frictional devices are controlled by a computer system or control unit, e.g., a transmission control unit (TCU), and various sensors and solenoids. ECTs have been known to improve the control of transmission shift points, with less abrupt gear shifting and improved shift smoothness. In addition, the flexibility of the ECT allows for better adaptability to changing conditions.

In a basic ECT design, a plurality of sensors monitor various characteristics of the vehicle, such as the speed of the vehicle, gear position selection, engine speed, throttle position, torque-converter speed/lock, wheel-slip, temperature, and the like. The control unit receives signals from the various sensors and acts on them through one or more fluid control solenoids.

A solenoid is a linear motor with a fixed range of travel. In an ECT, solenoids may be used to operate pistons and valves for accurate control of hydraulic fluid pressure or flow. The solenoids of an ECT system receive an electrical input, normally an electrical current, from a control unit and convert that electrical energy into mechanical energy to open and close a solenoid valve mechanically by providing an amount of output pressure that is a function of the amount of electrical input. The output pressure in turn is used to control the frictional devices.

The relationship between the amount of output pressure and a specific current is established through characterization. This relationship may be inclusive of various errors, e.g., variations in the repeatability of the solenoid, variations in the repeatability of the control unit, friction, corrosion, and the like. Variations or inaccuracies in the output pressure supplied by a solenoid may decrease the shift quality, i.e., may result in abrupt shifting or a decrease in shifting smoothness. It is important to have precise, accurate and repeatable control of the solenoid opening, which in turn allows for precise, accurate and repeatable control of the shift points through the application of precise amounts of hydraulic fluid. Accordingly, it is desirable to provide improved methods of characterizing a solenoid and improved methods for providing more accurate current commands to deliver a precise and accurate pressure output in response to a command current.

SUMMARY

A method for characterizing a fluid control solenoid with current compensation is described. A current command is sent to the fluid control solenoid. The current command indicates a desired current value related to a desired fluid output pressure to be applied to the solenoid. An actual fluid output pressure is measured at a valve associated with the fluid control solenoid for the desired current value applied to the solenoid. An actual current received value at the fluid control solenoid is also measured. Post processing is then applied. A compensated current value related to the actual fluid output pressure is determined based on a difference between the current command and the actual current received value. Methods for dynamic current compensation are also described.

DETAILED DESCRIPTION OF THE PREFERRED EMBODIMENT(S)

Figure 1:
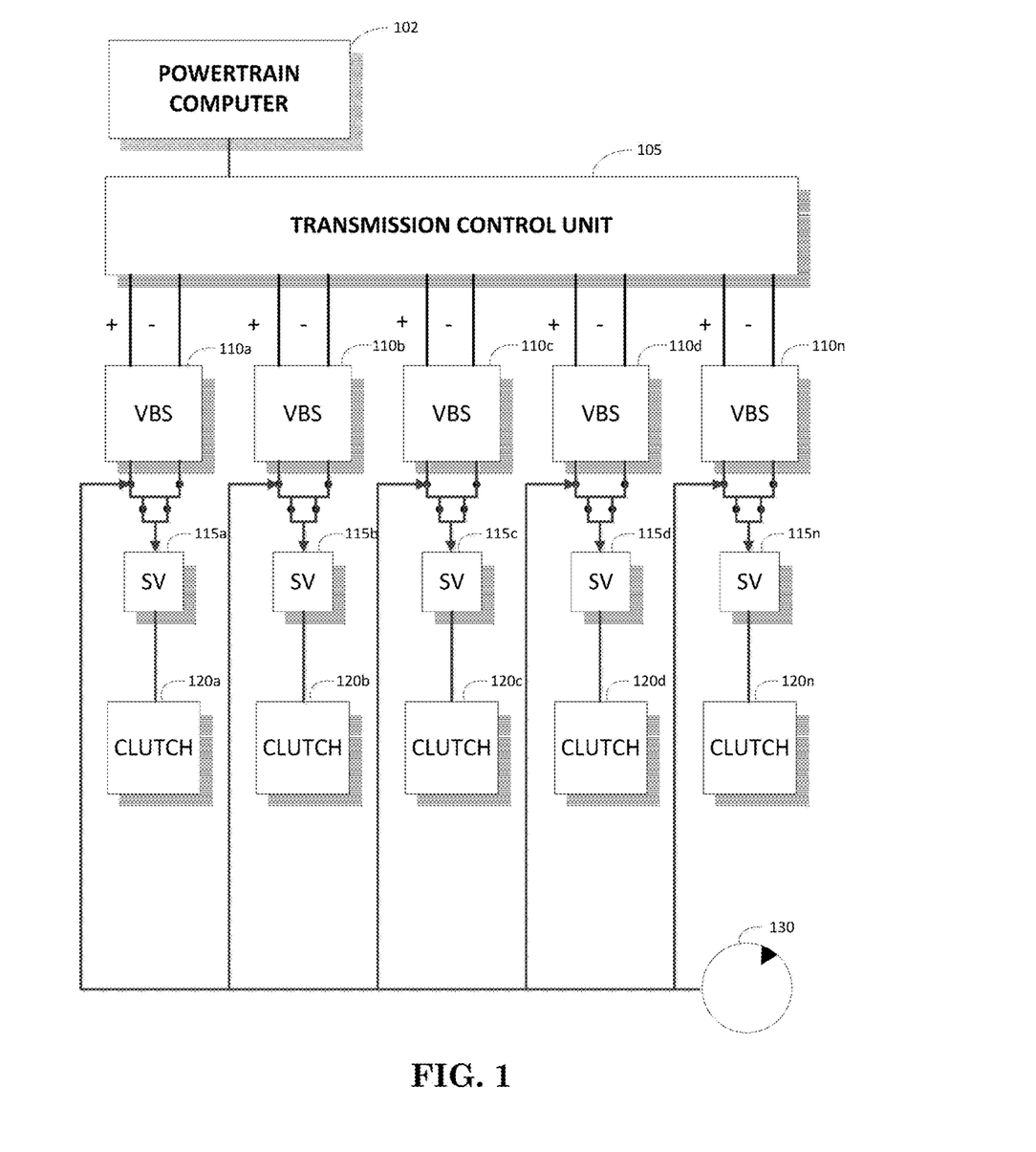
FIG. 1 is a diagram of a conventional transmission control circuit.

FIG. 1 is a diagram of a conventional transmission control circuit. It should be noted that the conventional transmission control circuit of FIG. 1 is used for illustrative purposes only, and the present invention is not limited to such conventional transmission control circuits and can be practiced in any transmission or engine control circuit used in pressure controlled systems (e.g., hydraulic or pneumatic). Referring to FIG. 1, there is shown a powertrain computer 102, a transmission control unit (TCU) 105, a plurality of variable bleed solenoids 110a-n, a plurality of high flow spool valves 115a-n, a plurality of transmission clutches 120a-n, and transmission pump 130. Although variable bleed solenoids are depicted, any type of solenoid may be used. Similarly, although high flow spool valves are depicted, any type of valve may be used. In addition, the same design may be used in an engine control circuit, supplementing the TCU for an engine control unit (ECU) and the transmission pump for an engine pump.

During operation of the transmission, the powertrain computer 102 monitors certain vehicle operating parameters, such as speed of the vehicle, gear position selection, engine speed, throttle position, torque-converter speed/lock, wheel-slip, temperature, and the like, and in response sends commands to the TCU 105 to execute certain functions, e.g., gear changes, at certain times during vehicle operation. The TCU 105 operates in open loop control to provide one or more current command signals to the respective variable bleed solenoids 110a-n to energize them. Each variable bleed solenoid 110a-n is associated with a high flow spool valve 115a-n, each of which control hydraulic pressure to an associated transmission clutch 120a-n.

Figure 2:
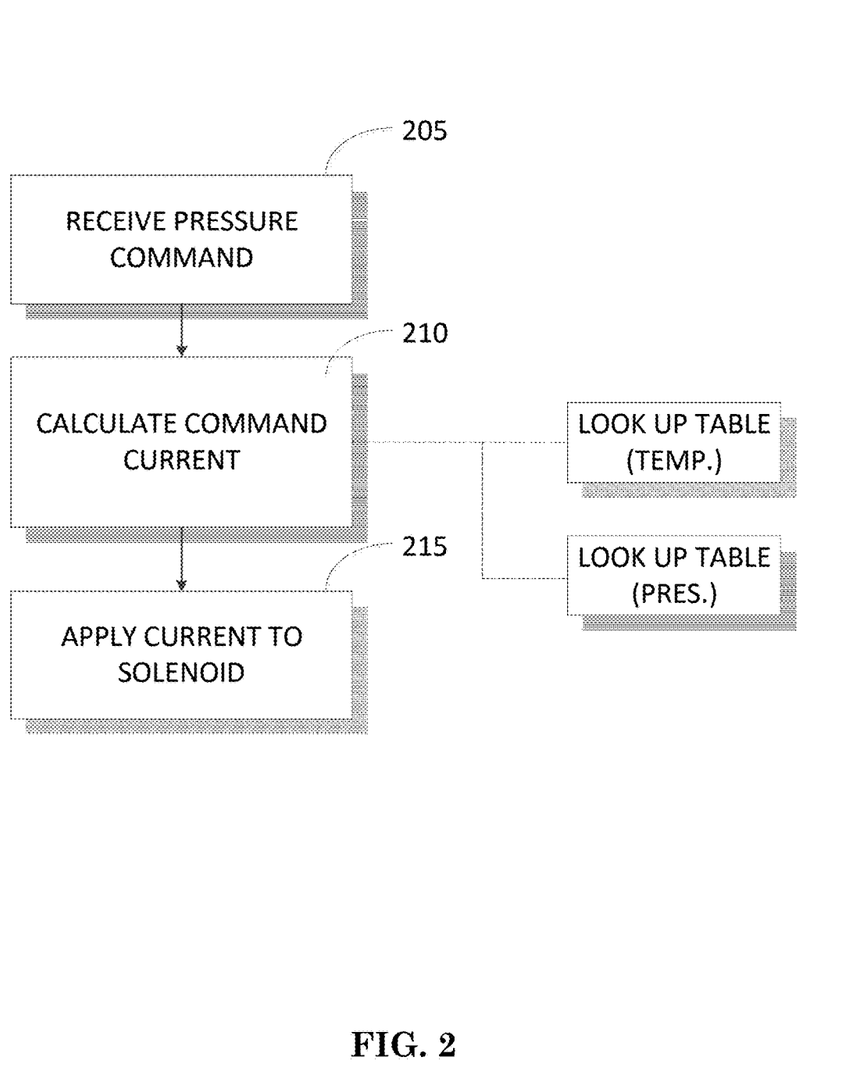
FIG. 2 is a diagram of a conventional transmission control process.

FIG. 2 is a diagram of a conventional transmission control process. Referring to FIG. 2, at step 210, the TCU receives a pressure command for at least one of the respective clutches in the system from the power train computer. At step 210, the TCU calculates a command current signal to achieve the desired pressure indicated by the pressure command. The calculated command current signal is determined using a lookup or characterization table for temperature of the fluid and a lookup or characterization table for the pressure of the fluid. At step 215, the TCU applies the current to at least one of the respective solenoids.

Figure 3:
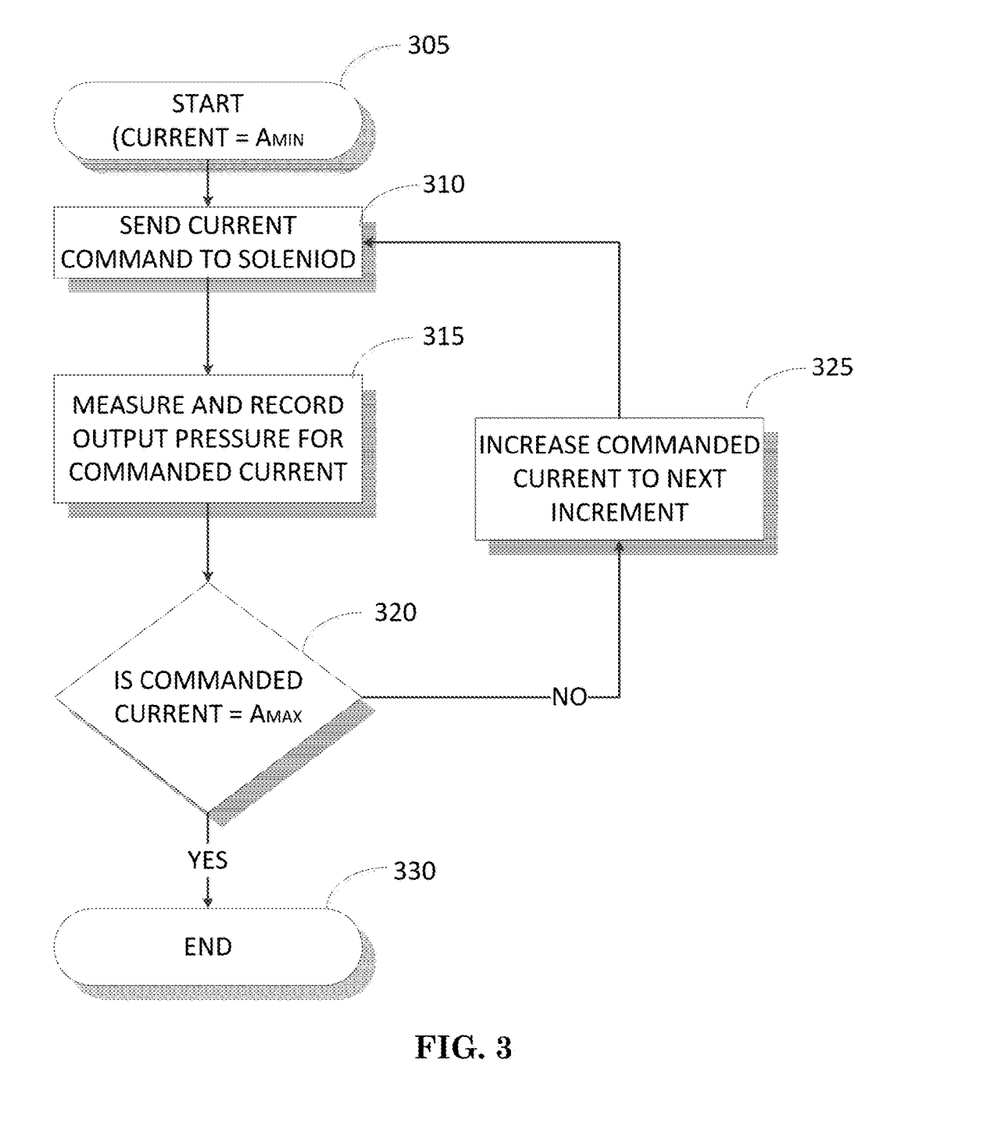
FIG. 3 is a flow diagram of a prior art method for characterizing a solenoid in a transmission or an engine.

The lookup or characterization table provides the relationship between the amount of output pressure and a specific current. The lookup or characterization table is established through characterization of the solenoid. FIG. 3 is a flow diagram of a prior art method for characterizing a solenoid in a transmission or an engine. Referring to FIG. 3, a prior art method for characterizing a solenoid in a transmission or engine begins by sweeping current from a minimum current value ($A_{min}$) to a maximum current value ($A_{max}$). This may be accomplished by sending incremental increasing current commands from a TCU or ECU to the solenoid. The solenoid receives the increasing current commands and supplies an output pressure based on the specific amount of current commanded. At step 305, the method is started, with a desired current equal to $A_{min}$. At step 310, the desired current is sent from a control unit of a TCU or ECU to the solenoid. At step 315, as a result of the commanded current, the solenoid delivers a corresponding output of pressure. That output pressure is then measured and recorded. At step 320, if the commanded current is equal to $A_{max}$, the method is completed at step 330. If the commanded current is not equal to $A_{max}$, at step 325 the current is incrementally increased and the method proceeds until the current is equal to $A_{max}$. The method is then applied in the opposite direction (now shown), in which current is then swept in the opposite direction, i.e., from $A_{max}$ to $A_{min}$. This may be accomplished by sending incremental decreasing current commands from a TCU or ECU to the solenoid. The corresponding output of pressure for each decreasing incremental current command from $A_{max}$ to $A_{min}$ is measured and recorded as described above. The resulting data pairs, i.e., the commanded current values and corresponding pressure values are then stored as characterization points. The data values may be stored in the lookup or characterization table.

The incremental current commands sent from the TCU or ECU may include intrinsic error directly related to the TCU or ECU that may be factored into the output pressure ultimately recorded during the characterization process. For example, the TCU or ECU may command 300 mA to achieve a desired pressure; however the current received may be only 295 mA or may be 305 mA. This may result in a pressure that is too low or too high being applied by the solenoid. This intrinsic error may be a result of variations in solenoid repeatability, friction, system leakage, variations in spool valve clearances, and the like.

Figure 4:
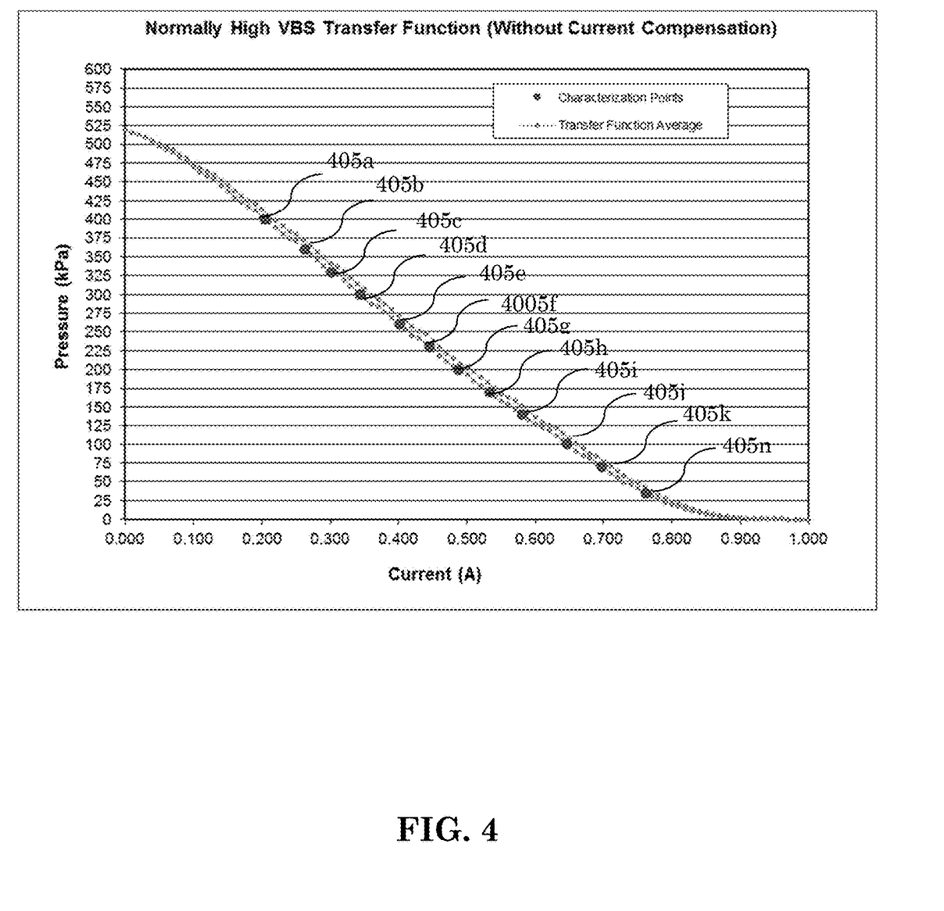
FIG. 4 is a graphical representation of the pressure-current relationship resulting from the method described in FIG. 3.

FIG. 4 is a graphical representation of a pressure-current relationship resulting from an application of the prior art method described in FIG. 3. A first axis of the graph corresponds to a range of pressures measured in units of kilopascals (kPa). A second axis of the graph corresponds to a range of current values measured in amperes (A). The current may be a percentage (e.g., 0% to 100%, or 0.0 to 1.0) of a maximum current. Referring to FIG. 4, as described above, current is first swept from 0.000 A ($A_{min}$) to 1.000 A ($A_{max}$). As the current is swept from 0.000 A to 1.000 A, the pressure decreases from approximately 525 kPa to 0 kPa. Current is then swept in the opposite direction, from 1.000 A to 0.000 A. As the current is swept from 1.000 A to 0.000 A, the pressure increases from 0 kPa to 525 kPa. In the present example, the sweeping current commands are made in 10 mA increments. This is not intended to be limiting, and it should be noted that any current increments may be used. It should also be noted that the variation between the plotted increasing and decreasing current sweeps for the same current values may result from hysteresis. Characterization points 405a-n are determined based on the recorded pressure values at specific current values during each sweep of current. These characterization points may be used to create a characterization lookup table for determining a plurality of desired currents relating to various desired pressures, which in turn may be used for calibration during an implementation. An example characterization table corresponding to the characterization points 405a-n in FIG. 4 is shown below in Table 1.

TABLE 1

Example Characterization Table
Characterization Table

| Pressure (kPA) | Current (A) |
|---|---|
| 35.00 | 0.761 |
| 70.00 | 0.697 |
| 100.00 | 0.646 |
| 140.00 | 0.580 |
| 170.00 | 0.532 |
| 200.00 | 0.488 |
| 230.00 | 0.445 |
| 260.00 | 0.402 |
| 300.00 | 0.344 |
| 330.00 | 0.301 |
| 360.00 | 0.263 |
| 400.00 | 0.205 |

Separate lookup tables for both increasing and decreasing desired pressures may also be used. For example, an increasing pressure table may be used when a desired pressure is greater than a previously applied pressure. Alternatively, a decreasing pressure table may be used when a desired pressure is less than a previously applied pressure. Lookup tables are used by the part manufacturers to calibrate the ECU or TCUs to provide the correct current commands to obtain various desired pressure outputs.

Figure 5:
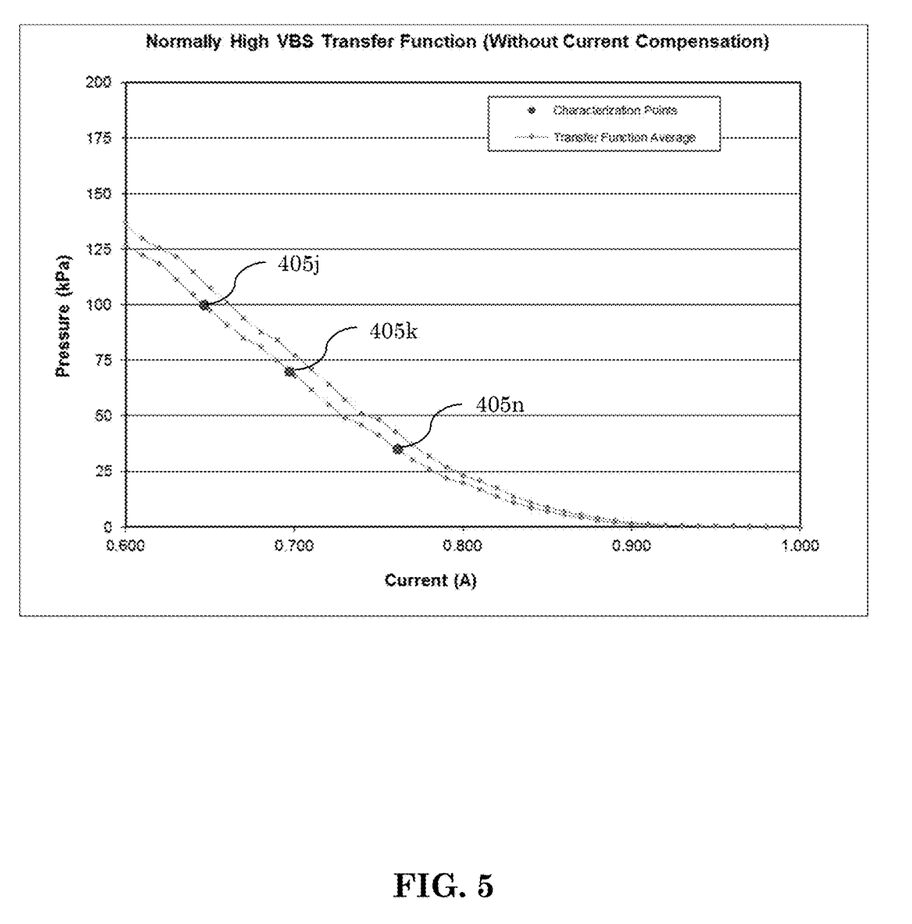
FIG. 5 is a magnified view of the graphical representation of FIG. 4.

FIG. 5 is a magnified view of the graphical representation of FIG. 4. As shown in FIG. 5, as the current is swept in both directions (i.e., increasing and decreasing), the resulting incremental data points are not smooth, but show slight fluctuations in both directions. These fluctuations may be a result of the intrinsic error directly related to the TCU or ECU that is factored into the output pressure ultimately recorded during the characterization process. As a result the characterization points selected may include inaccuracies.

Figure 6:
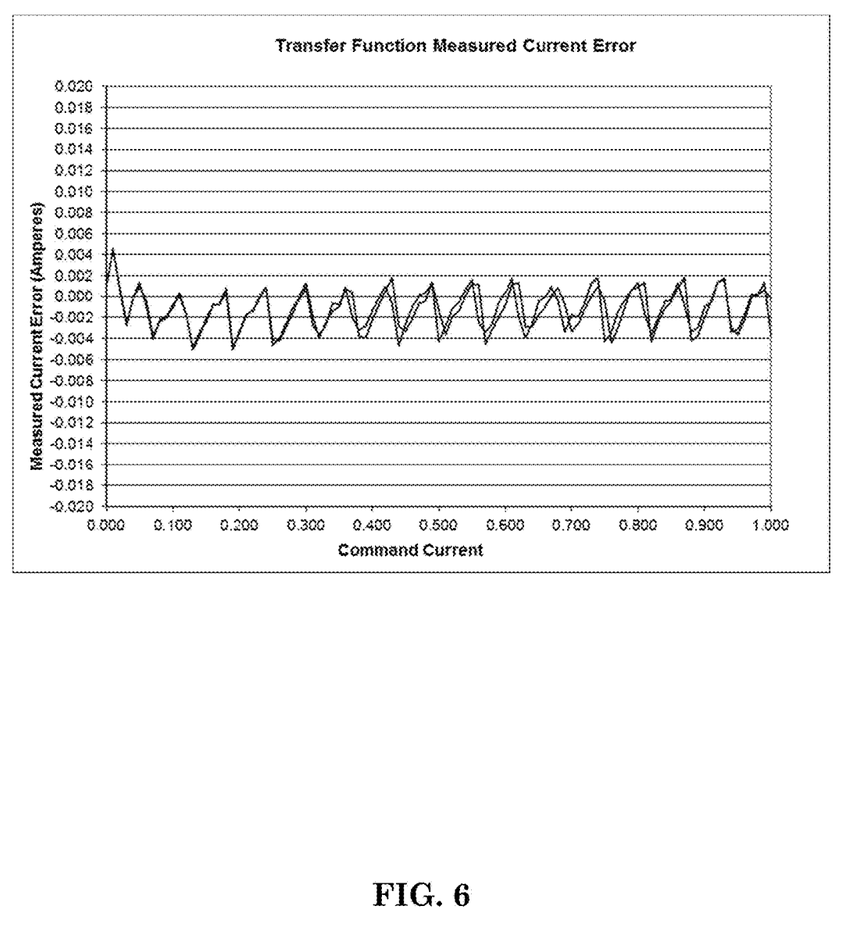
FIG. 6 is a graphical representation of the raw current error of a TCU or ECU that is factored into the characterization process.

FIG. 6 is a graphical representation of the raw current error of a TCU or ECU that is factored into the characterization process. A first axis of the graph corresponds to a range of commanded current values. A second axis of the graph corresponds to the error of the commanded current determined by measuring the current actually received at the solenoid and comparing that measurement to the commanded current. As shown in FIG. 6, the amplitude of the error is considerable, ranging from approximately −0.005 A to 0.005 A for the commanded currents.

As discussed above, variations or inaccuracies in the output pressure supplied by a solenoid may decrease the shift quality, i.e., may result in abrupt shifting or a decrease in shifting smoothness. It is important to have precise, accurate and repeatable control of the solenoid opening—which in turn allows for precise, accurate and repeatable control of the shift points through the application of precise amounts of hydraulic fluid. Removal of the TCU or ECU error to provide more accurate current commands to deliver a precise and accurate pressure output in response to a command current may be accomplished by the current compensation method that will now be described.

Figure 7:
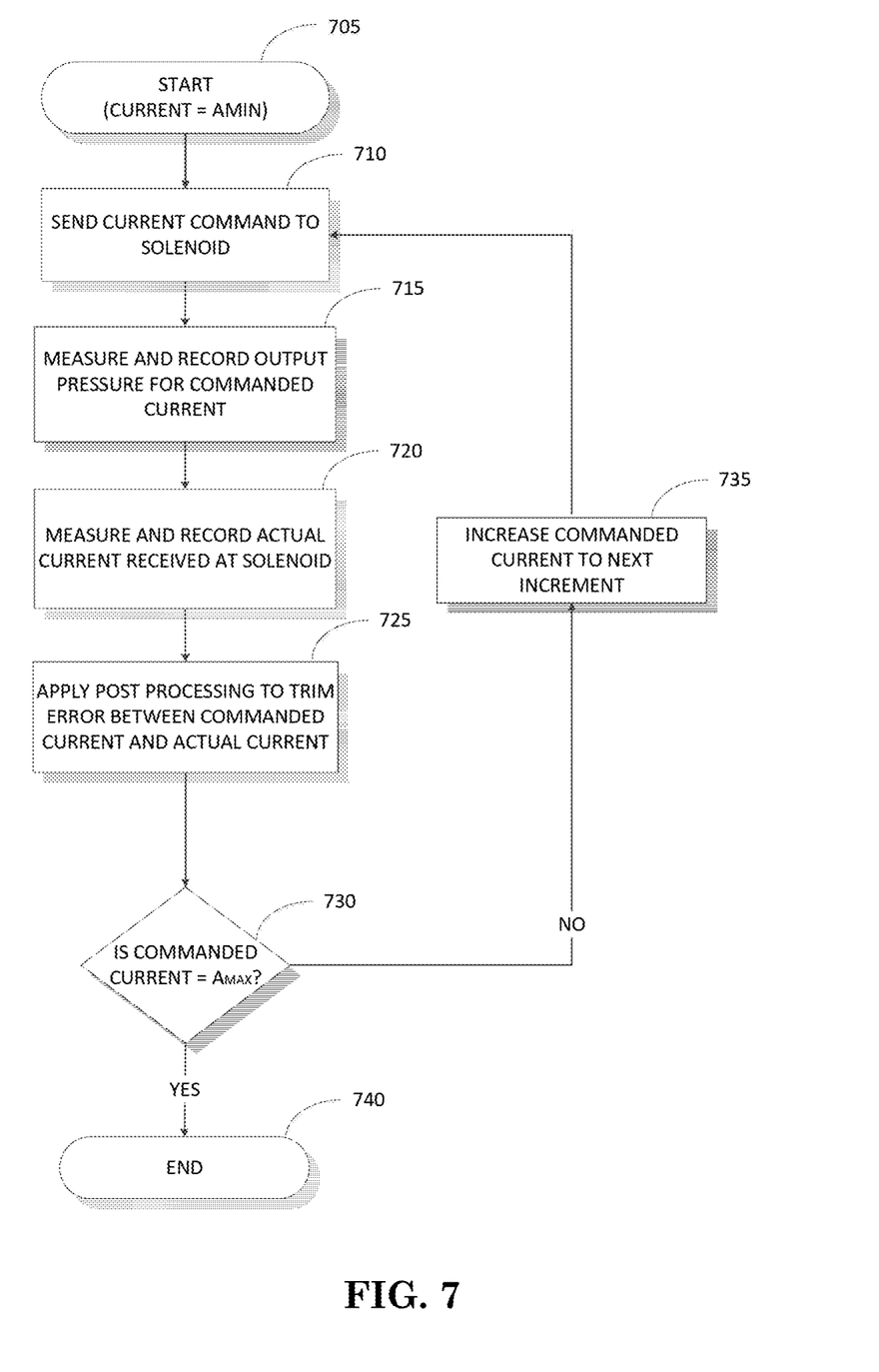
FIG. 7 is a flow diagram of a method for characterizing a solenoid with current compensation.

FIG. 7 is a flow diagram of a preferred embodiment of the present invention. Referring to FIG. 7, a method for characterizing a solenoid with current compensation in a transmission or engine is described. At step 705, the method is started, with a desired current equal to $A_{min}$. At step 710, the desired current is sent from a control unit of a TCU or ECU to the solenoid. At step 715, as a result of the commanded current, the solenoid delivers a corresponding output of pressure. That output pressure is then measured and recorded. At step 720, the actual received current at the solenoid is measured and recorded. At step 725, post-processing is applied to trim out the current error, i.e., the difference in commanded current and actual measured current. At step 730, if the commanded current is equal to $A_{max}$, the method is completed at step 740. If the commanded current is not equal to $A_{max}$, at step 735 the current is incrementally increased and the method proceeds until the current is equal to $A_{max}$. The method is then applied in the opposite direction (now shown), in which current is then swept in the opposite direction, i.e., from $A_{max}$ to $A_{min}$. This may be accomplished by sending incremental decreasing current commands from a TCU or ECU to the solenoid. The corresponding output of pressure for each decreasing incremental current commands from $A_{max}$ to $A_{min}$ is measured and recorded as described above. Post-processing is applied in the same way. The resulting data pairs, i.e., the compensated current values and corresponding pressure values are then stored as characterization points. The data values may be stored in a characterization table.

The post-processing at step 725 may be implemented using the following interpolation formula:

$$y = y_1 \frac{(x - x_1)(y_2 - y_1)}{x_2 - x_1} \qquad \text{Equation 1}$$

where $y_1$ is the desired pressure, $y_2$ is the actual measured pressure, $x_1$ is the commanded current, and $x_2$ is the actual measured current.

Figure 8:
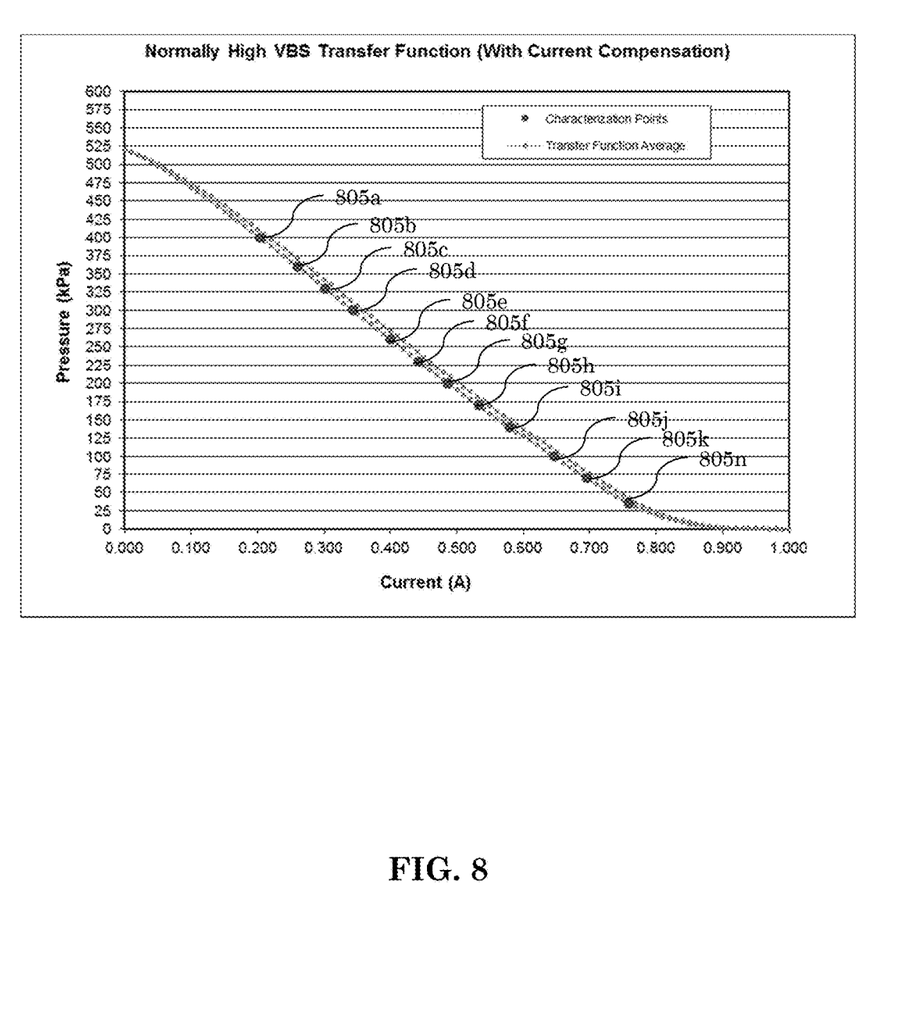
FIG. 8 is a graphical representation of the pressure-current relationship resulting from the method described in FIG. 7.

FIG. 8 is a graphical representation of the pressure-current relationship resulting from the method described in FIG. 7. A first axis of the graph corresponds to a range of pressures measured in units of kPa. A second axis of the graph corresponds to a range of current values in units of A. The current may be a percentage (e.g., 0% to 100%, or 0.0 to 1.0) of a maximum current. Referring to FIG. 8, as described above, current is first swept from 0.000 A ($A_{min}$) to 1.000 A ($A_{max}$). As the current is swept from 0.000 A to 1.000 A, the pressure decreases from 525 kPa to 0 kPa. Current is then swept in the opposite direction, from 1.000 A to 0.000 A. As the current is swept from 1.000 A to 0.000 A, the pressure increases from 0 kPa to 525 kPa. In the present example, the sweeping current commands are made in 10 mA increments. As described above, the actual pressure for each commanded current is measured at the solenoid. Post-processing is applied to trim out the current error, i.e., the difference in commanded current and actual measured current. Characterization points 805a-n are determined based on the recorded pressure values at compensated current values based on the post processing during each sweep of current. These post-processed characterization points may be used to create a more precise and accurate characterization lookup table for determining a plurality of desired currents relating to various desired pressures. An example characterization table corresponding to FIG. 8 is shown below in Table 2, below.

TABLE 2

Example Characterization Table With Current Compensation
Characterization Table

| Pressure (kPA) | Current (A) |
|---|---|
| 35.00 | 0.760 |
| 70.00 | 0.696 |
| 100.00 | 0.646 |
| 140.00 | 0.579 |
| 170.00 | 0.533 |
| 200.00 | 0.487 |
| 230.00 | 0.442 |
| 260.00 | 0.401 |
| 300.00 | 0.343 |
| 330.00 | 0.302 |
| 360.00 | 0.260 |
| 400.00 | 0.203 |

It should be noted that the characterization tables without current compensation (Table 1) and the characterization table with current compensation (Table 2) are different. In the examples provided, the characterization table with current compensation observes a 3 mA=3 kPa of error improvement.

Figure 9:
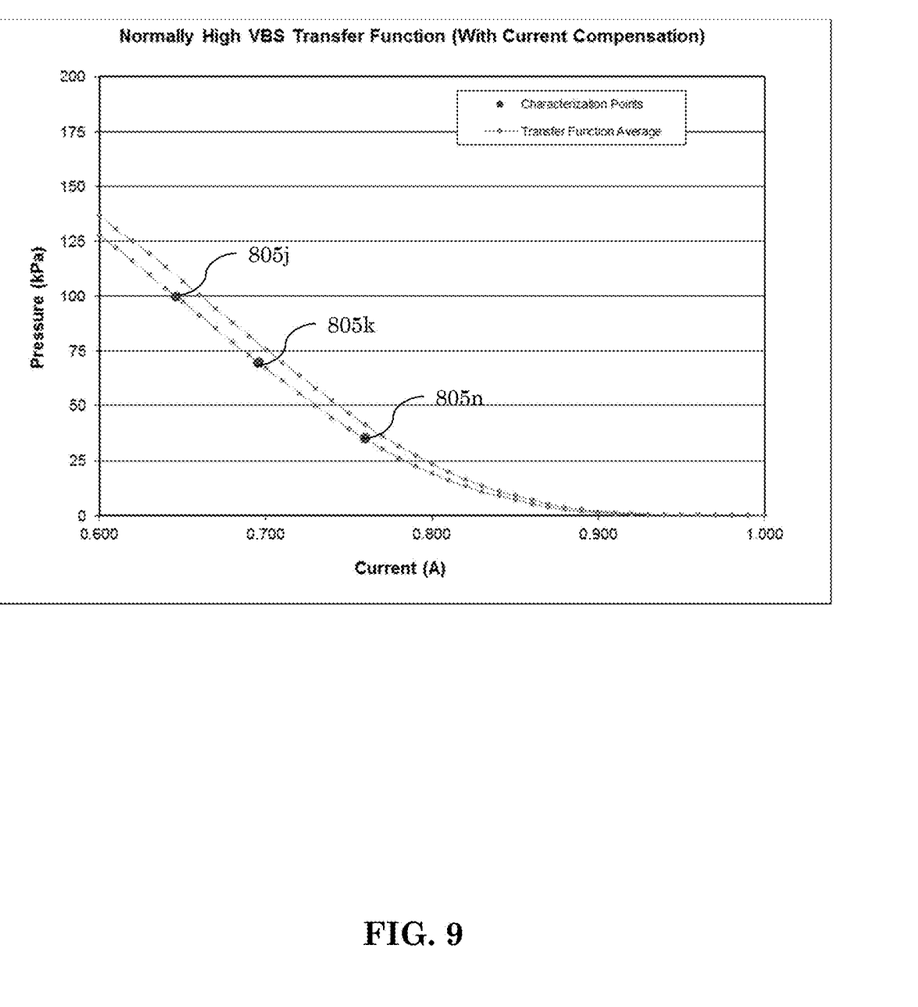
FIG. 9 is a magnified view of the graphical representation of FIG. 8.

FIG. 9 is a magnified view of the graphical representation of FIG. 8. As shown in FIG. 9, as the current is swept in both directions (i.e., increasing and decreasing), the resulting data points are smoother than those observed in FIG. 5. The slight fluctuations or oscillations due to current error have been removed as a result of the post processing method as shown in FIG. 7. These fluctuations are a result of the intrinsic error directly related to the TCU or ECU that is factored into the output pressure ultimately recorded during the characterization process. As a result the characterization points selected may include inaccuracies.

Figure 10:
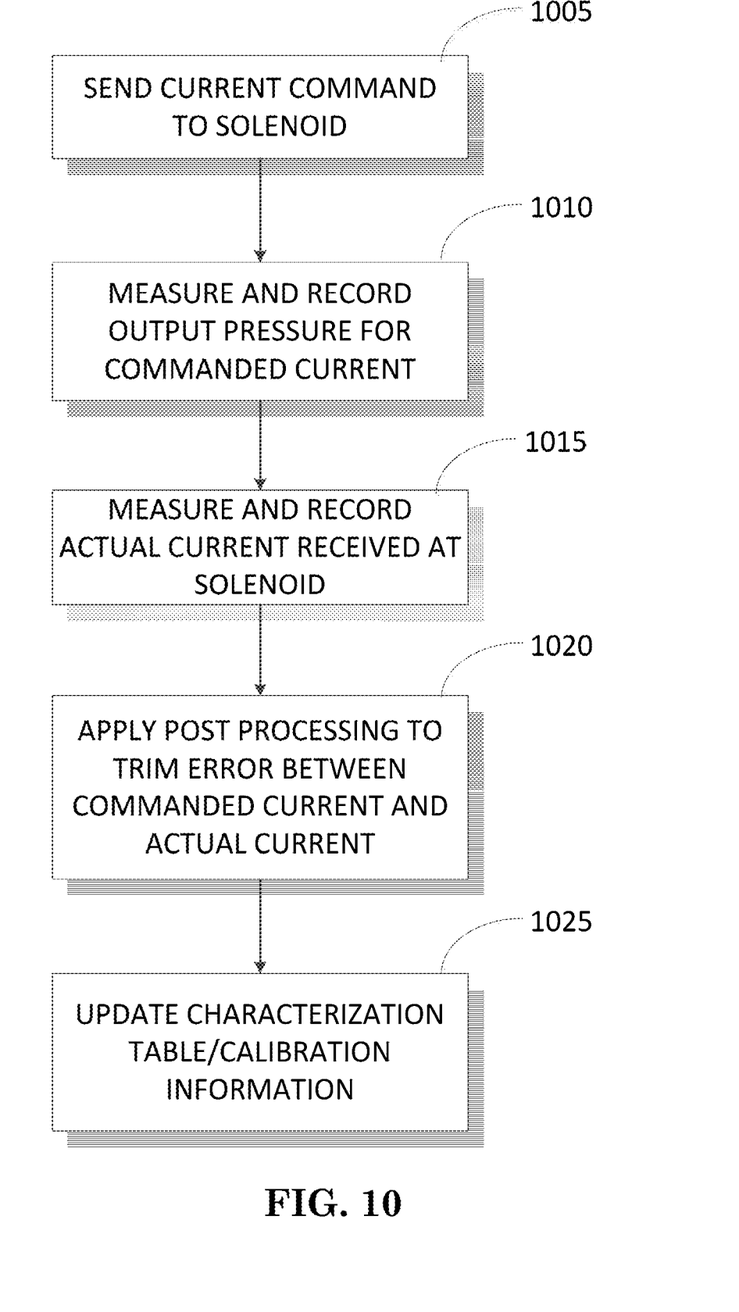
FIG. 10 is a flow diagram of a method for dynamically calibrating a solenoid during its intended use.

In another embodiment, the method as described in FIG. 7 may be applied dynamically. Overtime, the conditions within a transmission or engine may degrade. For example, parts may wear and degrade, and the variations in solenoid repeatability may increase. Therefore it is desirable for solenoids to be dynamically calibrated throughout their lifetime to consistently achieve precise pressure outputs. FIG. 10 is a flow diagram of a method for dynamically calibrating a solenoid during its intended use. At step 1005, a desired current is sent from a control unit of a TCU or ECU to the solenoid to produce a desired pressure output. At step 1010, as a result of the commanded current, the solenoid delivers a corresponding output of pressure. That output pressure is then measured and recorded. At step 1015, the actual received current at the solenoid is measured and recorded. At step 1020, post-processing is applied to trim out the current error, i.e., the difference in commanded current and actual measured current. Based on the result of the post processing, at step 1025, the characterization table or calibration information stored in a memory of the TCU or ECU may be updated to reflect the compensated current value and the corresponding desired pressure. This in turn will allow for a more precise delivery of pressure in the future.

Figure 11:
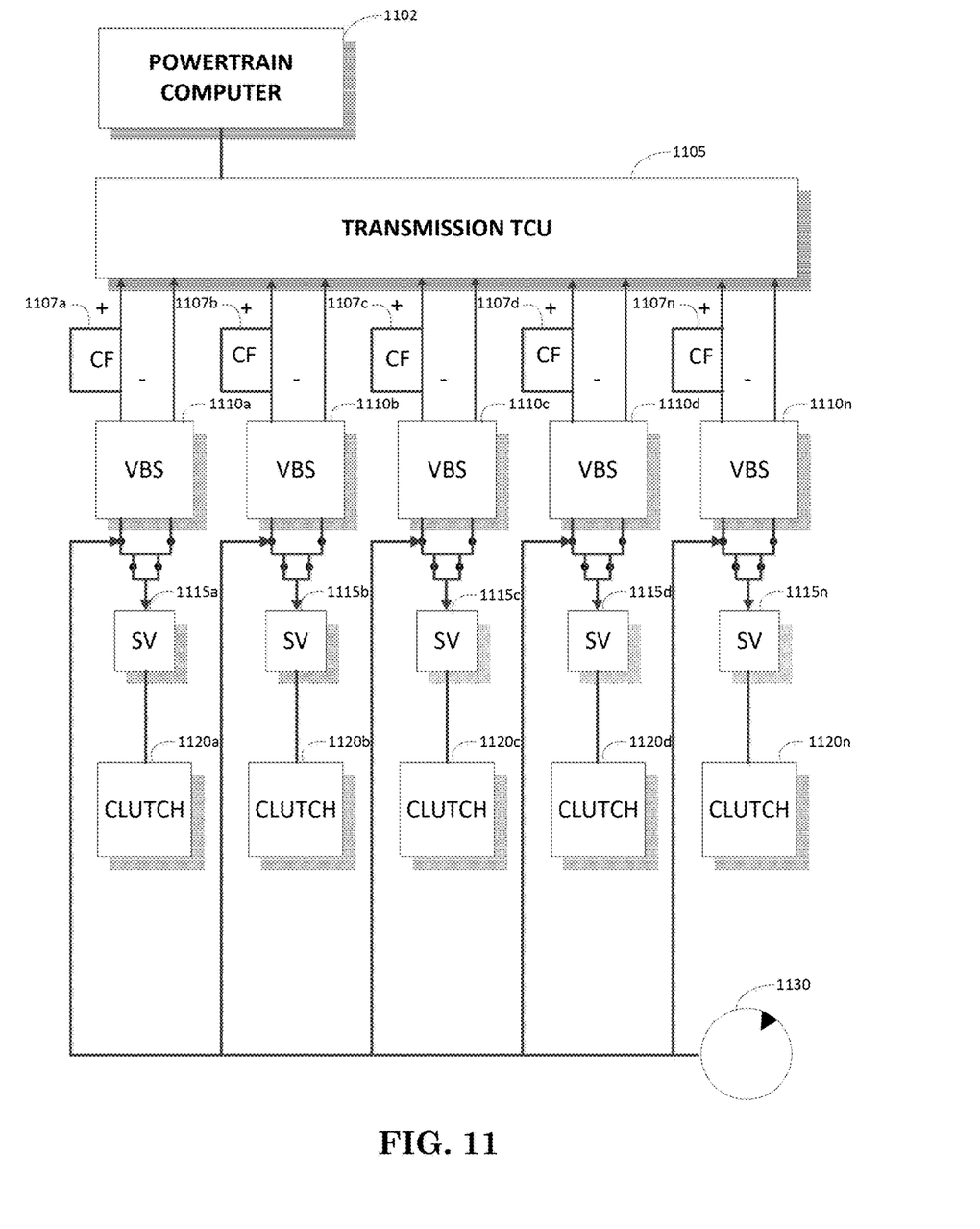
FIG. 11 is a diagram of a transmission control circuit capable of dynamic current compensation.

FIG. 11 is a diagram of a transmission control circuit capable of dynamic current compensation. Referring to FIG. 11, there is shown a powertrain computer 1102, a transmission control unit (TCU) 1105, a plurality of current feedback units 1107a-n, a plurality of variable bleed solenoids 1110a-n, a plurality of high flow spool valves 1115a-n, a plurality of transmission clutches 1120a-n, and transmission pump 1130. Although variable bleed solenoids are depicted, any type of solenoid may be used. Similarly, although high flow spool valves are depicted, any type of valve may be used. In addition, the same design may be used in an engine control circuit, supplementing the TCU for an engine control unit (ECU) and the transmission pump for an engine pump.

During operation of the transmission, the powertrain computer 1102 monitors certain vehicle operating parameters, such as speed of the vehicle, gear position selection, engine speed, throttle position, torque-converter speed/lock, wheel-slip, temperature, and the like, and in response sends commands to the TCU 1105 to execute certain functions, e.g., gear changes, at certain times during vehicle operation. The TCU 1105 operates in open loop control to provide one or more current command signals to the respective variable bleed solenoids 1110a-n to energize them. Each variable bleed solenoid 1110a-n is associated with a high flow spool valve 1115a-n, each of which control hydraulic pressure to an associated transmission clutch 1120a-n. When the TCU 1105 receives a pressure command from the powertrain computer 1102, the TCU calculates a command current to apply to the solenoid, based on the desired pressure indicated in the pressure command. As explained above in reference to FIG. 2, the calculated command current signal is determined using a lookup or characterization table for temperature of the fluid and a lookup or characterization table for the pressure of the fluid. When the current is applied to a respective solenoid 1110a-n, the associated current feedback unit 1107a-n will measure the actual current applied at a respective solenoid 1110a-n and feedback that measurement to the TCU 1105. The TCU 1105 will use that feedback along with an actual measured output pressure to dynamically adjust the lookup or characterization table, if an adjustment is required.

Although features and elements are described above in particular combinations, one of ordinary skill in the art will appreciate that each feature or element can be used alone or in any combination with the other features and elements.

What is claimed is:

1. A method for characterizing a fluid control solenoid with current compensation, the method comprising:
    sending a current command to the fluid control solenoid, wherein the current command indicates a desired current value related to a desired fluid output pressure to be applied to the solenoid;
    measuring an actual fluid output pressure at a valve associated with the fluid control solenoid for the desired current value applied to the solenoid;
    measuring an actual current received value at the fluid control solenoid; and
    applying post processing, wherein a compensated current value related to the actual fluid output pressure is determined based on a difference between the current command and the actual current received value using an interpolation formula $$y = y_1 \frac{(x - x_1)(y_2 - y_1)}{x_2 - x_1}$$

wherein, $y_1$ is the desired fluid output pressure, $y_2$ is the actual fluid output pressure, $x_1$ is the commanded current, and $x_2$ is the actual current received value.

2. The method of claim 1, further comprising:
    recording the compensated current value and the actual fluid output pressure in a characterization table.

3. The method of claim 1, wherein the fluid control solenoid is a variable bleed solenoid (VBS).

4. The method of claim 1, wherein the valve is a high flow spool valve.

5. A method for dynamic current compensation of a fluid control solenoid, the method comprising:
    receiving a pressure command, wherein the pressure command indicates a desired fluid pressure value to be applied at the fluid control solenoid;
    calculating a current command, wherein the calculated current command is determined based on a look-up table, and wherein the look-up table includes a list of related current values and fluid output pressure values;
    sending the calculated current command to the fluid control solenoid;
    measuring an actual fluid output pressure at a valve associated with the fluid control solenoid for the calculated current command;
    measuring an actual current received value at the fluid control solenoid;
    applying post processing, wherein a compensated current value related to the actual fluid output pressure is determined based on a difference between the calculated current command and the actual current received value using an interpolation formula $$y = y_1 \frac{(x - x_1)(y_2 - y_1)}{x_2 - x_1}$$

wherein, $y_1$ is the desired fluid output pressure, $y_2$ is the actual fluid output pressure, $x_1$ is the commanded current, and $x_2$ is the actual current received value; and updating the look-up table.

6. The method of claim 5, wherein the fluid control solenoid is a variable bleed solenoid (VBS).

7. The method of claim 5, wherein the valve is a high flow spool valve.

8. A fluid pressure control system, comprising:
    a power train computer;
    a fluid control solenoid;
    a transmission control unit (TCU) configured to:
        receive a pressure command from the power train computer, wherein the pressure command indicates a desired fluid pressure value to be applied at the fluid control solenoid;
        calculate a current command, wherein the calculated current command is determined based on a look-up table, and wherein the look-up table includes a list of related current values and fluid output pressure values; and
        send the calculated current command to the fluid control solenoid;
    a fluid pressure sensor configured to measure an actual fluid output pressure at a valve associated with the fluid control solenoid for the calculated current command;

a current sensor configured to measure an actual current received value at the fluid control solenoid; and the TCU further configured to:

apply post processing, wherein a compensated current value related to the actual fluid output pressure is determined based on a difference between the calculated current command and the actual current received value using an interpolation formula $$y = y_1 \frac{(x - x_1)(y_2 - y_1)}{x_2 - x_1}$$

wherein, $y_1$ is the desired fluid output pressure, $y_2$ is the actual fluid output pressure, $x_1$ is the commanded current, and $x_2$ is the actual current received value, and update the look-up table.

9. The system of claim 8, wherein the fluid control solenoid is a variable bleed solenoid (VBS).

10. The system of claim 8, wherein the valve is a high flow spool valve.

* * * * *

UNITED STATES PATENT AND TRADEMARK OFFICE
CERTIFICATE OF CORRECTION

PATENT NO. : 9,671,032 B2
APPLICATION NO. : 14/520963
DATED : June 6, 2017
INVENTOR(S) : Andrew Robert Castora et al.

Page 1 of 1

It is certified that error appears in the above-identified patent and that said Letters Patent is hereby corrected as shown below:

In the Specification

At Column 5, Lines 48-49, delete "$y = y_1 \frac{(x-x_1)(y_2-y_1)}{x_2-x_1}$" and insert therefor --$y = y_1 + \frac{(x-x_1)(y_2-y_1)}{x_2-x_1}$--.

In the Claims

In Claim 1, at Column 8, Lines 1-4, after the words "and the actual current received value using an interpolation formula", delete "$y = y_1 \frac{(x-x_1)(y_2-y_1)}{x_2-x_1}$" and insert therefor --$y = y_1 + \frac{(x-x_1)(y_2-y_1)}{x_2-x_1}$--.

In Claim 5, at Column 8, Lines 37-41, after the words "and the actual current received value using an interpolation formula", delete "$y = y_1 \frac{(x-x_1)(y_2-y_1)}{x_2-x_1}$" and insert therefor --$y = y_1 + \frac{(x-x_1)(y_2-y_1)}{x_2-x_1}$--.

Signed and Sealed this
Twenty-eighth Day of May, 2019

Andrei Iancu
*Director of the United States Patent and Trademark Office*